United States Patent
Wells et al.

(10) Patent No.: US 7,904,267 B2
(45) Date of Patent: Mar. 8, 2011

(54) ADAPTIVE RESOLVER COMPENSATION CONTROLLER

(75) Inventors: Jason Wells, Zionsville, IN (US); Marco Amrhein, Champaign, IL (US)

(73) Assignee: P.C. Krause & Associates, Inc., Lafayette, IN (US)

( * ) Notice: Subject to any disclaimer, the term of this patent is extended or adjusted under 35 U.S.C. 154(b) by 311 days.

(21) Appl. No.: 12/172,969

(22) Filed: Jul. 14, 2008

(65) Prior Publication Data

US 2010/0004895 A1    Jan. 7, 2010

Related U.S. Application Data

(60) Provisional application No. 60/959,339, filed on Jul. 13, 2007.

(51) Int. Cl.
*G01C 17/38*    (2006.01)
(52) U.S. Cl. ........................................................... 702/94

(58) Field of Classification Search .................... 702/94, 702/150, 151, 154; 700/302; 318/605, 661
See application file for complete search history.

(56) References Cited

U.S. PATENT DOCUMENTS

| | | | |
|---|---|---|---|
| 2005/0333539 | * | 2/2005 | Ishizuka et al. ................. 702/94 |
| 2008/0120055 A1* | | 5/2008 | Cheng ............................. 702/94 |

FOREIGN PATENT DOCUMENTS

| | | | |
|---|---|---|---|
| DE | 100 36 090 B4 | | 1/2004 |
| WO | WO 2009/012236 | * | 1/2009 |

\* cited by examiner

*Primary Examiner* — Michael P Nghiem
(74) *Attorney, Agent, or Firm* — Woodard Emhardt Moriarty McNett & Henry LLP

(57) ABSTRACT

An adaptive method and device for identification and compensation of errors in resolver output signals which can increase the accuracy of position estimates of the resolver angle is disclosed. The method utilizes the ideal orthogonal relationship of two resolver output devices to determine an error factor. The error factor is then used to correct the resolver position estimate.

6 Claims, 5 Drawing Sheets

ADAPTIVE RESOLVER COMPENSATION CONTROLLER

CROSS-REFERENCE TO RELATED APPLICATIONS

The present application claims the benefit of U.S. Provisional Patent Application Ser. No. 60/959,339, filed Jul. 13, 2007, entitled "Adaptive Resolver Compensation Controller," which is herein incorporated by reference in its entirety.

This invention was made with Government support under Contract Number FA8650-04-D-2409 awarded by the U.S. Air Force. The United States Air Force has certain rights in the invention.

TECHNICAL FIELD OF THE INVENTION

The present invention generally relates to control systems and, more particularly, to an adaptive resolver compensation controller.

BACKGROUND OF THE INVENTION

Resolvers are commonly used in commercial, industrial, and military systems to obtain an estimate of the position to which the device is attached. A typical electrical resolver unit includes two stationary outer windings placed at ninety degree angles around an inner rotating winding which is coupled to the shaft of a rotating machine element. An excitation signal is applied to the rotating winding so that as the shaft rotates, a varying voltage is induced in the stationary windings. Because the stationary windings are ninety degrees apart, they will produce a sine and cosine variant of the excitation signal. By measuring the output sine and cosine signals in relation to the input excitation signal, a monitoring controller is able to determine the angular position of the shaft.

Under many of the control techniques applied to these devices, a velocity control objective is often achieved through some combination of differentiation, filtering, and estimation techniques. Such techniques often are unable to distinguish true position movement from reported position movement from the resolver which can lead to errors in the estimated velocity. As the performance requirements of the velocity control loop increase, the velocity-estimate errors lead to undesirable system performance. Such undesirable performance often includes the presence of electrical current ripple being generated in an electrical machine controlling the movement of the resolver.

In order to extend the performance range of such systems, it is possible to correct for the resolver signal errors which lead to the velocity estimate ripple. Past techniques have either not corrected for a sufficient portion of the resolver errors to meet all stringent performance requirements, have presented techniques which do not adaptively drive the error signals to zero, require additional computation power beyond the disclosed technique, or do not utilize the error information in the same fashion as the technique presented herein.

SUMMARY OF THE INVENTION

Accordingly, in one aspect, a method for identifying and compensating for position errors in resolver output signals is disclosed, comprising the steps of: a) receiving a first resolver output signal; b) receiving a second resolver output signal; c) approximating the first resolver output signal as a first equation wherein the first equation is a Fourier series based on a cosine function of an angular position $\theta$; d) approximating the second resolver output signal as a second equation; wherein the second equation is a Fourier series based on a sine function of a first sum which represents the sum of the angular position $\theta$ and a phase error $\phi$; and wherein the second resolver output signal is assumed to be ninety degrees out of phase with the first resolver output signal; e) using the assumed orthogonality of said first resolver output signal and said second resolver output signal to create an third equation which defines a first error factor as a function of the constant 1 minus the squares of said first equation and said second equation; f) cross-correlating the third equation with $\cos(\theta)$, $\sin(\theta)$, $\cos(2\theta)$, $\sin(2\theta)$, and the constant 1 to determine a plurality of compensation signals; g) using the plurality of compensation signals in a feedback loop to create a corrected first resolver signal and a corrected second resolver signal; and h) using the corrected first resolver signal and the corrected second resolver signal to determine a corrected angular position $\theta$ of the resolver.

A device for correcting errors in the signals received from a resolver, comprising: a) a processing unit; b) a means for receiving a first resolver signal and a second resolver signal; and c) a means for outputting signals to a position controller; wherein the processing unit executes computer readable code to create an output signal representing the corrected angular position $\theta$ of a rotating element connected to the resolver; and wherein the output signal is determined based on the method comprising: 1) receiving a first resolver output signal; 2) receiving a second resolver output signal; 3) approximating the first resolver output signal as a first equation wherein the first equation is a Fourier series based on a sine function of an angular position $\theta$; 4) approximating the second resolver output signal as a second equation; wherein the second equation is a Fourier series based on a cosine function of a first sum which represents the sum of the angular position $\theta$ and a phase error $\phi$; and wherein the second resolver output signal is assumed to be ninety degrees out of phase with the first resolver output signal; 5) using the assumed orthogonality of said first resolver output signal and said second resolver output signal to create an third equation which defines a first error factor as a function of the constant 1 minus the squares of said first equation and said second equation; 6) cross-correlating the third equation with $\cos(\theta)$, $\sin(\theta)$, $\cos(2\theta)$, $\sin(2\theta)$, and the constant 1 to determine a plurality of compensation signals; 7) using the plurality of compensation signals in a feedback loop to create a corrected first resolver signal and a corrected second resolver signal; 8) using the corrected first resolver signal and the corrected second resolver signal to determine a corrected angular position $\theta$ of the resolver.

DETAILED DESCRIPTION OF THE PREFERRED EMBODIMENT

Figure 1:
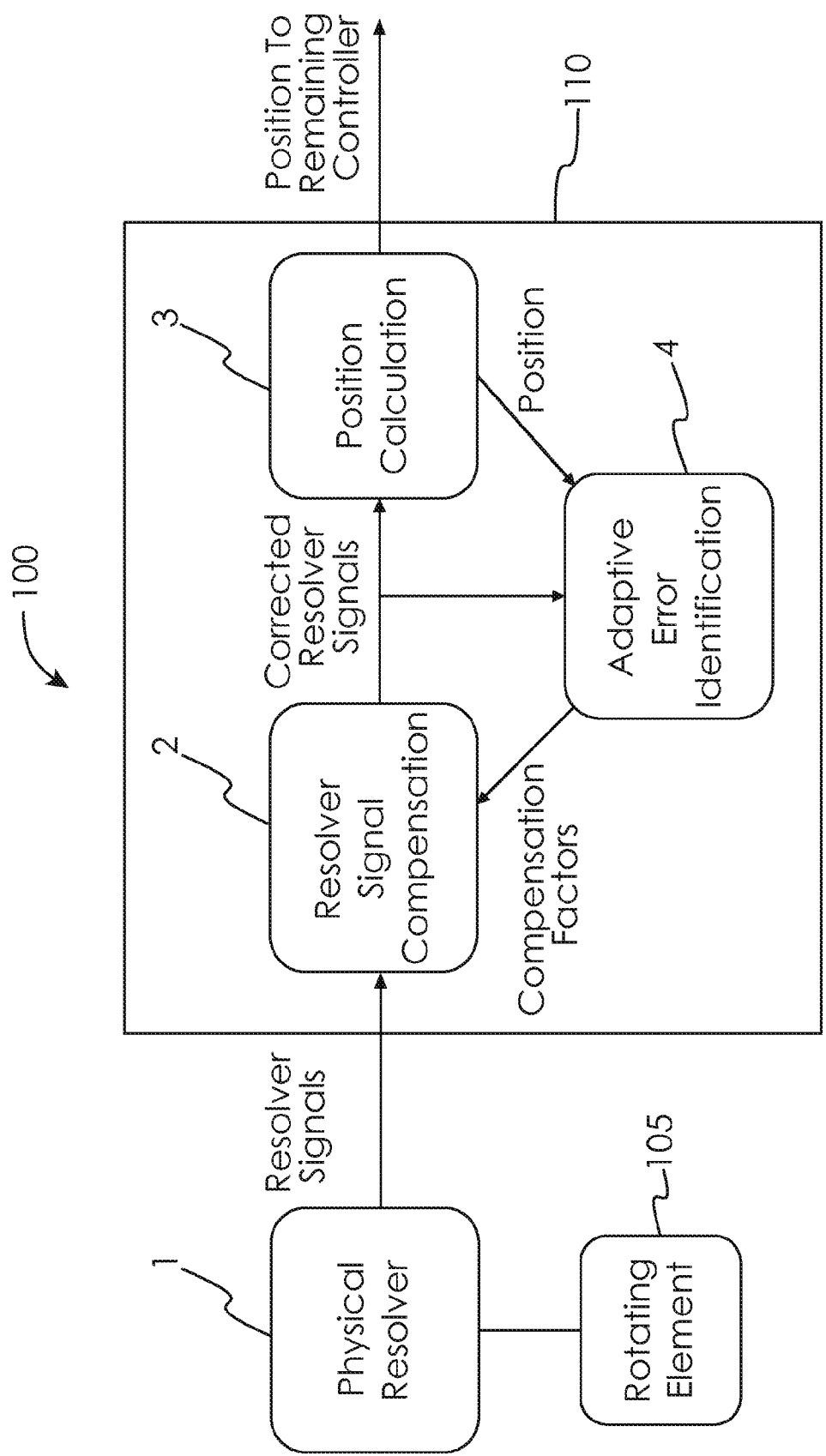
FIG. 1. is a block diagram overview according to one embodiment of the present disclosure.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 3:
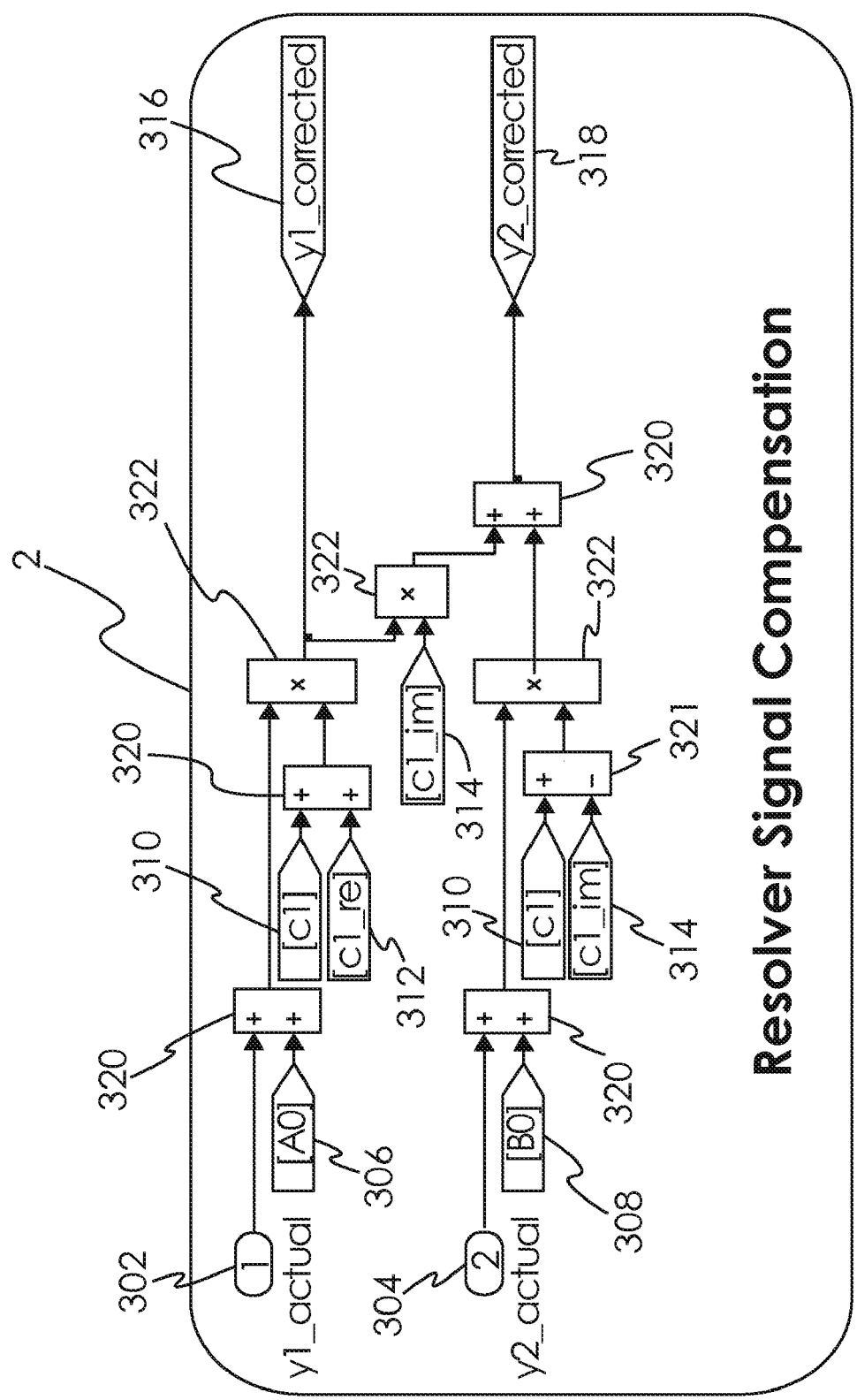
FIG. 3. is a block diagram of the resolver signal compensation block of FIG. 1.
Figure 4:
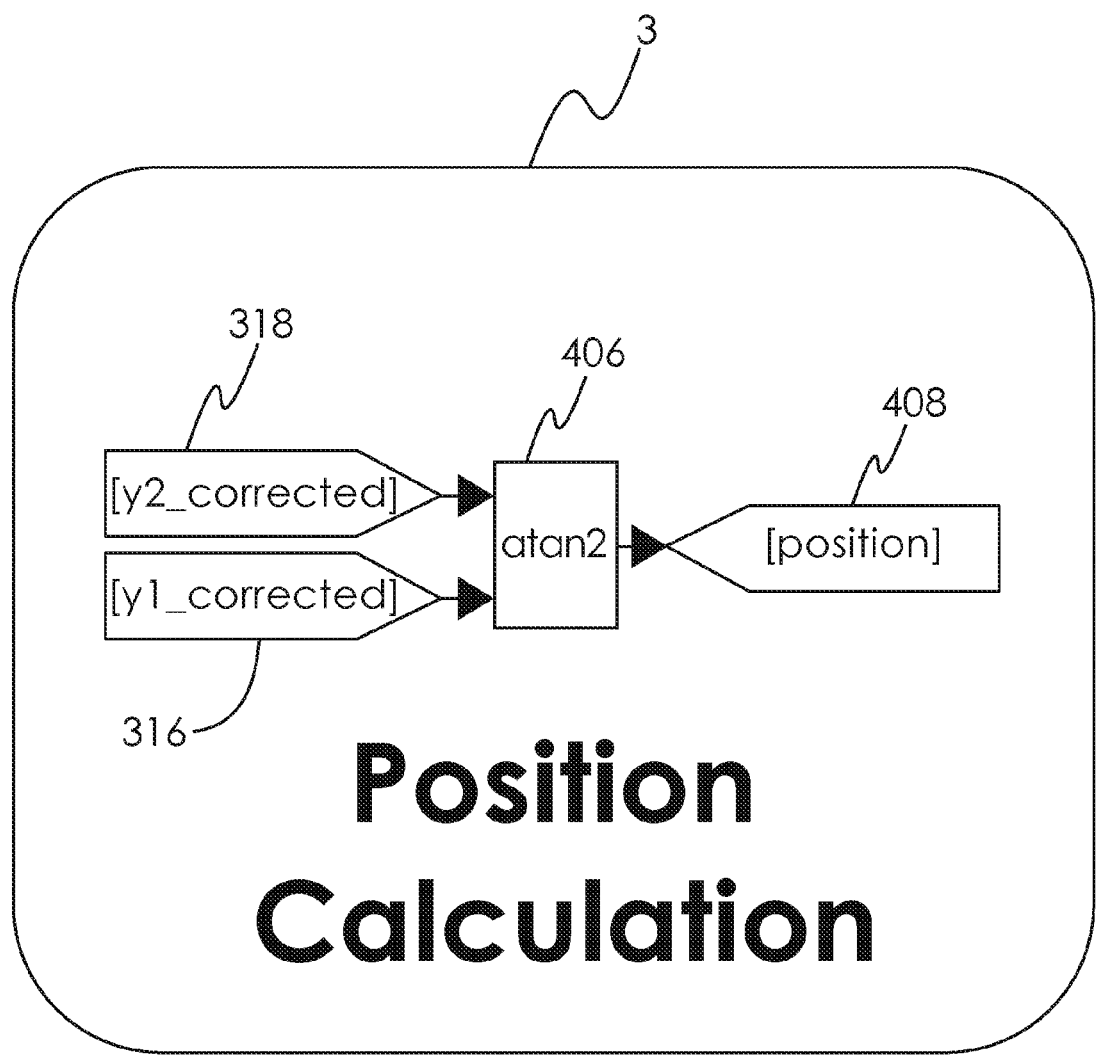
FIG. 4. is a block diagram of the position calculation block of FIG. 1.
Figure 5:
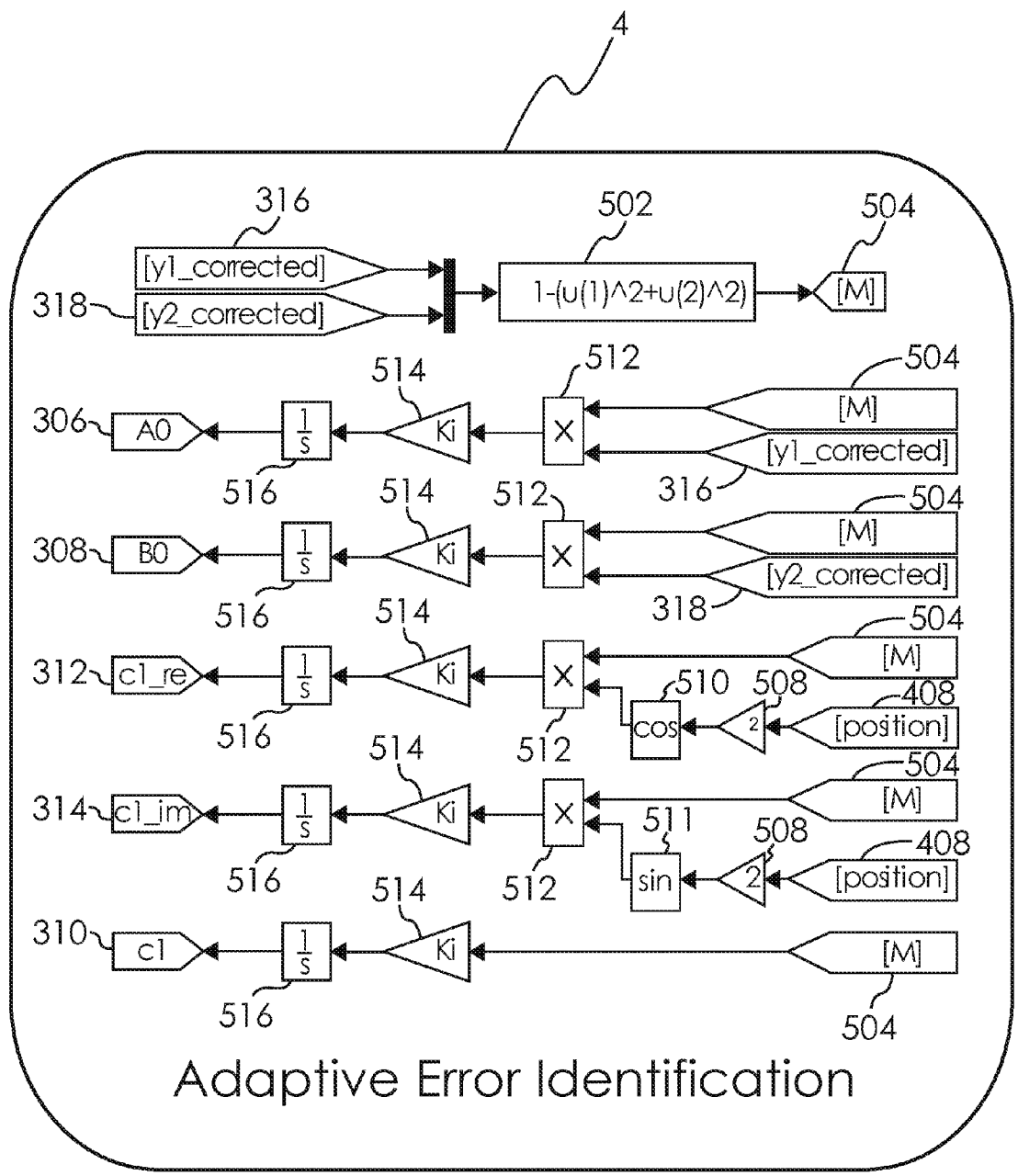
FIG. 5. is a block diagram of the adaptive error signal correlation block of FIG. 1.

FIG. 1 presents a block diagram overview of signal flow through an adaptive resolver compensation controller system 100 according to one embodiment of the present disclosure. A physical resolver 1 is connected to a rotating element 105 and produces resolver signals for input to a resolver signal compensation block 2. A preferred embodiment resolver signal compensation block 2 is illustrated in FIG. 3. The resolver signal compensation block 2 produces corrected resolver signals that are input to a position calculation block 3. A preferred embodiment position calculation block 3 is illustrated in FIG. 4. The position calculation block 3 produces a position signal that is applied both to the remaining controller and also, as a feedback signal, to an adaptive error identification block 4. A preferred embodiment adaptive error identification block 4 is illustrated in FIG. 5. The adaptive error identification block 4 produces compensation factors that are supplied to the resolver signal compensation block 2 for use in producing the corrected resolver signals. It will be appreciated by those skilled in the art that the diagrams in FIGS. 3-5 comprise block diagrams usable as input to the simulation program SIMULINK® produced by The MathWorks, Inc. of Natick, Mass.

It shall be understood that a variety of techniques can be applied in the position calculation block 3. For this particular embodiment, it is assumed that the ideal resolver signals ($y_1$ and $y_2$) are related to the position ($\theta$) by $$y_1 = \cos(\theta)$$

$$y_2 = \sin(\theta) \tag{1}$$

which allows the position to be obtained by $$\theta = \tan^{-1}\left(\frac{y_2}{y_1}\right). \tag{2}$$

Due to manufacturing tolerances, the actual resolver signals are unlikely to be ideal but are typically periodic and can therefore be represented by a Fourier series. Although the adaptive controller can compensate for an arbitrary number of terms in the Fourier representation, it is typically sufficient to assume that the actual signal produced by the resolver ($y_1^{actual}$ and $y_2^{actual}$) are given by $$y_1^{actual} = A_1 \cos(\theta + \phi_A) + A_0$$

$$y_2^{actual} = B_1 \sin(\theta + \phi_B) + B_0 \tag{3}.$$

where $A_0$ and $B_0$ represent offset errors and $A_1$ and $B_1$ represent magnitude coefficients.

Since there is typically not enough information to determine whether the phase error ($\phi$) exists in the first or second signal, the assumption that all phase error is in $y_2^{actual}$ can be made to reduce the computation complexity of the adaptive controller giving $$y_1^{actual} = A_1 \cos(\theta) + A_0$$

$$y_2^{actual} = B_1 \sin(\theta + \phi) + B_0 \tag{4}.$$

Although this example illustrates the case where the error is assumed to exist only in $y_2^{actual}$, it shall be appreciated that the entire phase error may instead be assumed to exist only in $y_1^{actual}$.

Figure 2:
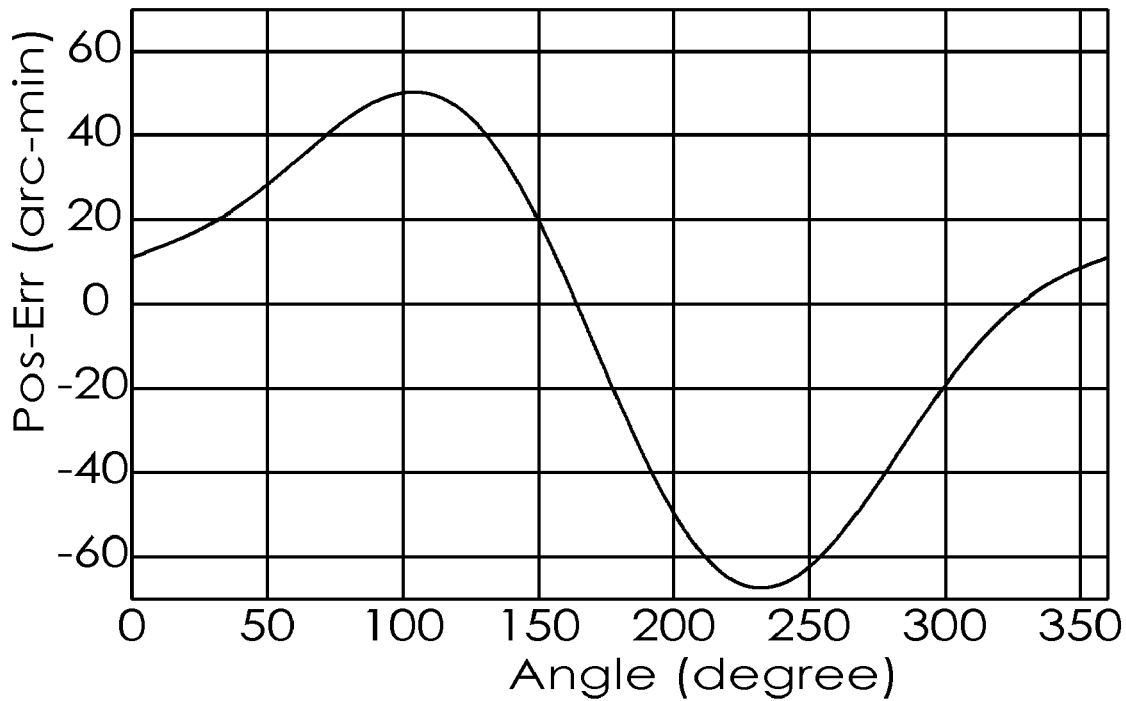
FIG. 2. illustrates typical position error profiles created by common resolver signal errors.
Figure 2:
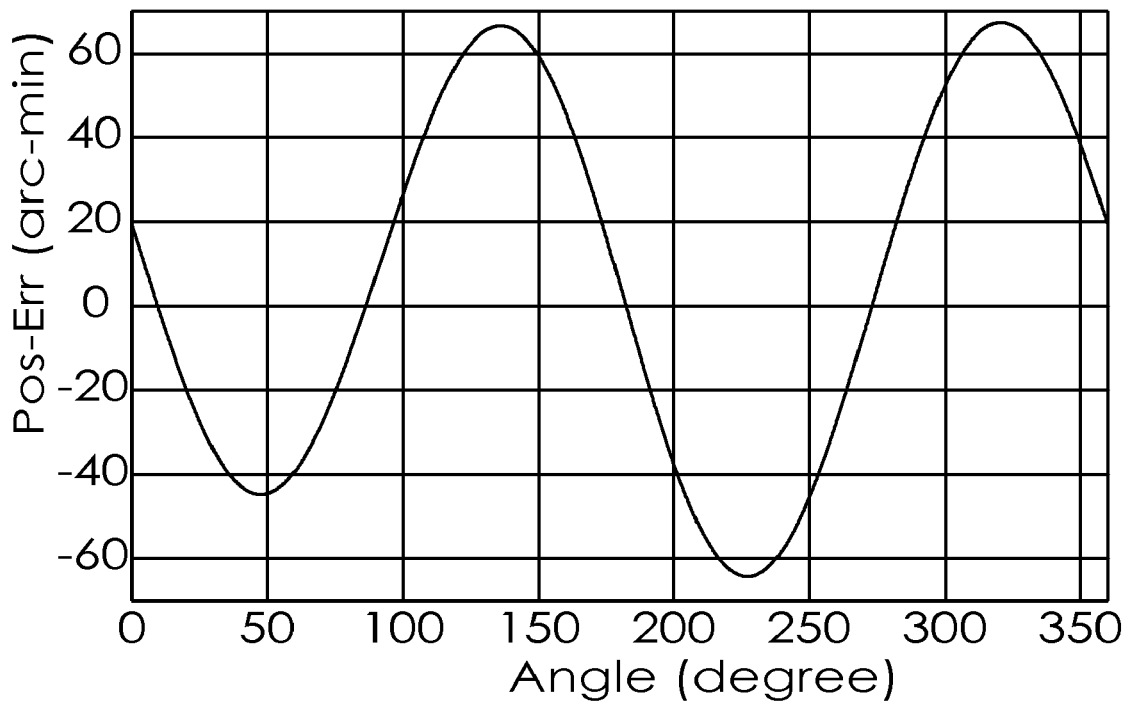

FIG. 2 illustrates a typical error profile which is caused by typical values for the coefficients A, B, and $\phi$ in (4) when the position is calculated by (2).

Information regarding the coefficients of the Fourier series can be obtained by exploitation of the orthoganality property of the ideal signal $y_1$ and $y_2$. Specifically, for this embodiment, the mathematical transformation $$M = 1 - ((y_1^{actual})^2 + (y_2^{actual})^2) \tag{5}$$

contains information regarding all five coefficients ($A_1$, $A_0$, $B_1$, $B_0$, and $\phi$) given in (4). Arithmetic substitution of (4) into (5) yields $$M = 1 - \left(A_0^2 + \frac{A_1^2}{2} + B_0^2 + \frac{B_1^2}{2}\right) - \tag{6}$$
$$\cos(\theta)[2A_0A_1 + 2B_0B_1\sin(\varphi)] - \sin(\theta)[2B_0B_1\cos(\varphi)] -$$
$$\cos(2\theta)\left[\frac{A_1^2}{2} - \frac{B_1^2\cos(2\varphi)}{2}\right] - \sin(2\theta)\left[\frac{B_1^2\sin(2\varphi)}{2}\right]$$

Performing cross-correlation of (6) with 1, $\cos(\theta)$, $\sin(\theta)$, $\cos(2\theta)$, and $\sin(2\theta)$ yields five adaptively generated control signals which can be fed back to the signal compensation block 2 to correct the measured resolver signals. The constant values determined for $A_0$ and $B_0$ may be used to determine an offset value which may be applied in the resolver signal compensation block 2. It shall be understood that the exact cross-correlation may be computationally difficult and any number of suitable substitutions to the cross-correlation, such as standard integration or low-pass filtering, can be used instead of or in addition to the representation shown in FIG. 3-5. It shall be further understood that the integral gains 514 (Ki) shown in FIG. 5 are not necessarily identical and can be tuned to achieve desirable performance from a given application. For example, higher gain settings may produce a faster response time, but at the expense of excess ripple. The gain setting may therefore be chosen to achieve the fastest response available for a tolerable amount of ripple.

As shown in FIG. 3, the resolver compensation block 2 receives the actual resolver signals 302 and 304 as input. The compensation signals 306, 308, 310, 312, and 314 are applied to the original resolver signals 302 and 304 using various function blocks 320, 321, and 322 to produce corrected resolver signals 316 and 318. As implemented in FIG. 3, the function blocks 322 are used to properly scale the magnitude coefficients $A_1$ and $B_1$. It shall be understood that the order in which the various compensation signals are applied within the resolver compensation block 2 may be varied depending on the application and the available processing capacity. In certain embodiments, it is not necessary to apply all of the compensation signals within the resolver signal compensation block 2 if it is desired to leave certain errors uncorrected.

As shown in FIG. 4, the position block 3 receives corrected resolver signals 316 and 318 as input, applies an inverse tangent function in block 406 (similar to equation (2) above), and outputs the result as position signal 408 to a remaining position controller (not shown) and to the adaptive error identification block 4.

As shown in FIG. 5, the adaptive error identification block 4 receives the corrected resolver signals 316 and 318 as input. Using the equation from (5) above, the resolver signals 316 and 318 are evaluated in block 502, which outputs a signal 504 representing M from equation (5) above. Blocks 512 multiply the signal 504 by the corrected resolver signals 316 and 318 and route the output to an integral gain block 514 and a continuous integrator 516 to produce the compensating signal 306 corresponding to $A_0$ above. Continuous integrators 516 may be implemented as continuous time integrators or as discrete time integrators, for example, in a digital signal processing system. The compensation signals 308, 312, 314, and 310 are produced in a similar fashion, as shown in FIG. 5. Blocks 508, 510, and 511 are used to determine the cosine or sine of an input position signal 408 as shown in FIG. 5. The compensation signals 306, 308, 310, 312, and 314 are output to resolver signal compensation block 2 for processing with the input resolver signals 302 and 304 as described above.

The present disclosure contemplates that the operations within the resolver signal compensation block 2 and the adaptive error identification block 4 may be performed asynchronously and/or at different sample rates. Other types of pre-scaling operations may also be used to improve the accuracy of the output signals. For example, if the excitation signal of the resolver is known and time varying, that information can be used to pre-scale the input resolver signals 302 and 304. It shall also be appreciated that the described method may be also be used in both continuous time and discrete time implementations. Because of the adaptive nature of the technique described above, the system 100 is robust against random noise on the resolver signals which may be introduced outside of the resolver 1.

In addition to the configuration described above, multiple error control loops may be run in parallel in digital implementations. For example, if there are periodic disturbances to the resolver signals which cause a different set of compensation signals to be used at different times, a separate control loop, consisting of blocks 2, 3, and 4, could be used at the same rate, but with different phasing.

System 100 may include one or more processors 110 which receive the resolver signals from the resolver 1. The processor performs the calculations described above and outputs the corrected position information to the remaining controller or controllers. In a preferred embodiment, the processor performs the calculations described above using the simulation program SIMULINK® produced by The MathWorks, Inc. of Natick, Mass. The processor may be any of a wide variety of general purpose processors or microprocessors such as the PENTIUM microprocessor manufactured by Intel Corporation, a POWER PC manufactured by IBM Corporation, a SPARC processor manufactured by Sun Corporation, or the like. It will be apparent to those of ordinary skill in the art, however, that other varieties of processors may also be used in a particular computer system.

The processor may receive information via a universal serial bus (USB) interface, integrated drive electronics (IDE) interface, a serial advanced technology attachment (SATA) interface, or other properly configured information interface devices. The interface devices allow the processor to communicate with various storage or input/output devices within the system 100 including a main memory coupled to the bus for storing dynamic information and instructions for the processor and a read-only memory coupled to the bus for storing static information and instructions for the processor.

The system 100 may also include mass storage devices such as a conventional hard disk drive, a floppy disk drive, a flash device (such as a "flash card" or SD card), an optical drive such as a compact disc (CD) drive, digital versatile disc (DVD) drive, HD DVD drive, Blue-Ray DVD drive, or another magnetic, solid state, or optical data storage device. Various input and output devices may also be included such a keyboard, mouse, and LCD or other appropriate output display. Additional electrical components such as transformers or amplifiers may also be included in the system 100 to adjust the input resolver signals to levels appropriate for use by the processor.

It shall be understood that the various components of system 100 are individually identified for ease in functional description, and that in practice these components may be implemented as single devices or as integrated multiple-function devices that incorporate the functionality of one or more of the described components. In addition, the resolver 1 may be external to the system 100 or integrated within the system 100. The system 100 may also be integrated into the remaining position controller or provided as a separate controller module.

The system 100 may also be incorporated into a protective casing or cabinet for applications where the system 100 will be subjected to excess heat, vibration, physical shock, or dirt. Additional protective devices may also be included in the system 100 to protect from electromagnetic interference or other external signals.

While the invention has been presented in the context of a specific embodiment, this is for the purpose of illustration rather than limitation. Other variations and modifications of the specific embodiment shown and described will be apparent to those skilled in the art within the intended spirit and scope of the invention.

What is claimed:

1. A method for identifying and compensating for position errors in resolver output signals, comprising the steps of:
   a) receiving a first resolver output signal;
   b) receiving a second resolver output signal;
   c) approximating the first resolver output signal as a first equation wherein the first equation is a first Fourier series based on a cosine function of an angular position $\theta$;
   d) approximating the second resolver output signal as a second equation;
      wherein the second equation is a second Fourier series based on a sine function of a first sum which represents the angular position $\theta$ plus a phase error $\phi$; and
      wherein the second resolver output signal is assumed to be ninety degrees out of phase with the first resolver output signal;
   e) using the assumed orthogonality of said first resolver output signal and said second resolver output signal to create a third equation which defines a first error factor as a function of a first constant minus the squares of said first equation and said second equation, wherein said first constant is 1;
   f) cross-correlating the third equation with $\cos(\theta)$, $\sin(\theta)$, $\cos(2\theta)$, $\sin(2\theta)$, and the first constant to determine a plurality of compensation signals;
   g) using the plurality of compensation signals in a feedback loop to create a corrected first resolver signal and a corrected second resolver signal;
   h) using the corrected first resolver signal and the corrected second resolver signal to determine, by a processor, a corrected angular position $\theta$ of the resolver; and
   i) outputting a corrected output signal representing the corrected angular position $\theta$ to a position controller.

2. The method of claim 1, wherein the first equation consists of the first two elements of the first Fourier series and the second equation consists of the first two elements of the second Fourier series, wherein one element of the first Fourier series is a second constant, and wherein one element of the second Fourier series is a third constant.

3. The method of claim 2, wherein the second and third constants are used to determine an offset which is considered in determining the value of the corrected output signal.

4. The method of claim 1, wherein the first Fourier series is $A_1 \cos(\theta) + A_0$ and the second Fourier series is $B_1 \sin(\theta+\phi) + B_0$.

5. The method of claim 4, wherein the first error factor is calculated based on the value of $$M = 1 - \left(A_0^2 + \frac{A_1^2}{2} + B_0^2 + \frac{B_1^2}{2}\right) - \cos(\theta)[2A_0A_1 + 2B_0B_1\sin(\varphi)] - \sin(\theta)[2B_0B_1\cos(\varphi)] - \cos(2\theta)\left[\frac{A_1^2}{2} - \frac{B_1^2\cos(2\varphi)}{2}\right] - \sin(2\theta)\left[\frac{B_1^2\sin(2\varphi)}{2}\right]$$

where M equals the first error factor.

6. A method for identifying and compensating for position errors in resolver output signals, comprising the steps of:
   a) receiving a first resolver output signal;
   b) receiving a second resolver output signal;
   c) approximating the first resolver output signal as a first equation wherein the first equation is a first Fourier series based on a sine function of an angular position θ;
   d) approximating the second resolver output signal as a second equation;
      wherein the second equation is a second Fourier series based on a cosine function of a first sum which represents the angular position θ plus, a phase error φ; and
      wherein the second resolver output signal is assumed to be ninety degrees out of phase with the first resolver output signal;
   e) using the assumed orthogonality of said first resolver output signal and said second resolver output signal to create a third equation which defines a first error factor as a function of a first constant minus the squares of said first equation and said second equation, wherein said first constant is 1;
   f) cross-correlating the third equation with cos(θ), sin(θ), cos(2θ), sin(2θ), and the first constant to determine a plurality of compensation signals;
   g) using the plurality of compensation signals in a feedback loop to create a corrected first resolver signal and a corrected second resolver signal;
   h) using the corrected first resolver signal and the corrected second resolver signal to determine, by a processor, a corrected angular position θ of the resolver; and
   i) outputting a corrected output signal representing the corrected angular position θ to a position controller.

* * * * *